United States Patent [19]

Suzuki et al.

[11] Patent Number: 4,487,501
[45] Date of Patent: Dec. 11, 1984

[54] PROCESS OF EXPOSING PHOTOSENSITIVE MEMBER

[75] Inventors: Shigeru Suzuki; Yutaka Koizumi; Nobuyuki Yanagawa; Koji Hirakura, all of Kanagawa; Chikara Imai, Tokyo, all of Japan

[73] Assignee: Ricoh Company, Ltd., Japan

[21] Appl. No.: 384,061

[22] Filed: Jun. 1, 1982

[30] Foreign Application Priority Data

Jun. 1, 1981 [JP] Japan .................. 56-084182

[51] Int. Cl.³ .................. G03B 27/48; G03B 27/50
[52] U.S. Cl. .................. 355/50; 355/77
[58] Field of Search .................. 355/8, 11, 50, 51, 27, 355/77

[56] References Cited

U.S. PATENT DOCUMENTS

| | | | |
|---|---|---|---|
| 3,687,545 | 8/1972 | Moorhusen | 355/51 X |
| 3,694,076 | 9/1972 | Weber | 355/50 |
| 4,118,118 | 10/1978 | Barto, Jr. | 355/11 X |
| 4,390,269 | 6/1983 | Henmi et al. | 355/27 |

Primary Examiner—Richard A. Wintercorn
Attorney, Agent, or Firm—Guy W. Shoup

[57] ABSTRACT

An original to be copied is placed in a given position. An exposure optics including a movable part is employed to focus an optical image of slitwise segment of the original on a photosensitive member. The photosensitive member moves in a given direction and at a given speed throughout the exposure. The location where the image of slitwise segment of the original is focused moves through the space of the arrangement at a given speed and in a direction opposite from the direction of movement of the photosensitive member throughout the exposure. Consequently, the location corresponding to the initiation of the exposure is situated downstream as viewed in the direction of movement of the surface of the photosensitive member while the location corresponding to the end of the exposure is situated upstream as viewed in the same direction. Upon termination of the exposure, the photosensitive member continues its movement which is the same as during the exposure while the movable part of the exposure optics returns to its start position.

14 Claims, 4 Drawing Figures

PROCESS OF EXPOSING PHOTOSENSITIVE MEMBER

BACKGROUND OF THE INVENTION

The invention relates to a process of exposing a photosensitive member.

A variety of processes have been proposed to effect a slitwise exposure of a photosensitive member moving in a given direction, by projecting an optical image of a stationary original onto the photosensitive member through exposure optics including movable part. These processes are in practical use in electrophotographic copying machines or apparatus for preparing masters in electrostatic printing arrangements.

In one process of exposing a photosensitive member which is well known and is extensively used, exposure optics including movable part is employed to effect a slitwise exposure of a photosensitive member, moving in a given direction, at a home location within the space of the arrangement by causing a movement of the movable part. In this arrangement, the time required for the movable part to return to its start position upon completion of the exposure which took place through the movement of the movable part cannot be utilized for initiating another exposure. Consequently, where a succession of copying operations are desired, there is produced a surface region on the photosensitive member which is located intermediate the trailing end of a first electrostatic latent image and the leading end of a second or next latent image and where no latent image can be formed. This presents a problem from the standpoint of an effective utilization of the photosensitive surface.

There is proposed an exposure process which permits an exposure of the photosensitive member during the returning movement of the movable part through a sophisticated design of the exposure optics, but which requires a complex arrangement and an increased cost. In addition, the latent images which are consecutively formed are oriented in opposite directions from adjacent ones, requiring a re-orientation of the resulting copies, which is troublesome.

A succession of electrostatic latent images can be formed in a manner such that the adjacent images are continuous from adjacent ones, by effecting exposure while maintaining the photosensitive member at a pause. However, an intermittent movement of the photosensitive member is necessary, requiring a complicated sequence control of the process. In addition, the movement of the photosensitive member is frequently interrupted because of the exposure, resulting in a reduced average speed of movement of the photosensitive member, which generally causes a reduction in the copying efficiency.

SUMMARY OF THE INVENTION

It is an object of the invention to provide a novel process of exposing a photosensitive member which permits a very effective utilization of a photosensitive surface thereof without involving a complication in the construction of the exposure optics or the sequence control.

It is a feature of the invention that an image location corresponding to the initiation of an exposure is situated downstream as viewed in the direction of movement of the surface of the photosensitive member while an image location corresponding to the end of the exposure is situated upstream as viewed in the same direction, with the image location moving through the space of the arrangement from the position corresponding to the initiation to the position corresponding to the end of the exposure. The term "exposure" used herein refers to the projection of an optical image of a slitwise segment of an original onto the surface of the photosensitive member, and the term "image location" refers to a location within the space of the arrangement where the optical image is focused and projected onto the surface of the photosensitive member. The image location corresponding to the initiation or the end of the exposure represents a location where the exposure is either initiated or terminated. The term "space within the arrangement" refers to a space which is fixed with respect to an arrangement in which the exposure takes place, namely, an electrophotographic copying machine or apparatus for preparing a master.

As used in the process of exposing a photosensitive member according to the invention, exposure optics used includes a movable part which undergoes a reciprocating movement, the exposure occurring during a forward stroke of the movement. If it is assumed that the return stroke of the movable part requires the same time interval as required for its forward stroke, it is possible to form a succession of contiguous image areas, each of which is formed by an exposure. In this manner, the photosensitive surface can be utilized in a very effective manner.

Since no exposure takes place during the return stroke of the movable part, no complex arrangement is required of the exposure optics. Since the exposure takes place only during the forward stroke, the latent images which are formed in succession are all oriented in the same direction.

DESCRIPTION OF EMBODIMENTS

Figure 1:
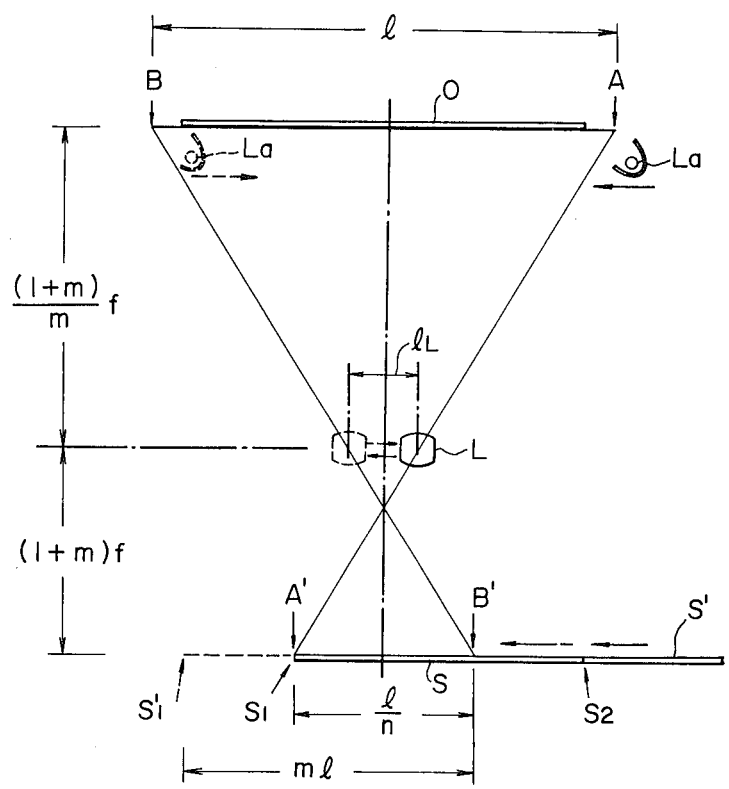
FIG 1 is a schematic front view of essential parts of an exposure apparatus which is used to carry out the invention.

Referring to FIG. 1, one form of an apparatus for exposing a photosensitive member which is used to carry out the invention is schematically illustrated. It is to be understood that the illustration is limited to only those parts of the apparatus which are necessary to understand the invention. An original O is placed, in planar form, on an 0 is placed, in planar form, on an original receptacle, not shown. A lamp La is disposed to effect a slitwise scanning from point A to point B. It is to be understood that the lamp which illuminates the original is not considered herein as part of exposure optics. As mentioned previously, the exposure optics of the invention includes a movable part, which must be driven by a suitable mechanism. However, such mechanism is considered herein as outside the exposure optics. Thus, the term "exposure optics" as used herein refers to a focusing lens system or a combination of focusing lens system and a plane mirror which directs reflected light from the original to an exposure location. In the example shown in FIG. 1, the exposure optics is defined by by a focusing lens system L, which represents the movable part of the exposure optics. The focusing lens system L represents a through-lens, and is reciprocable between a solid line position and a broken line position.

In the present example, it is assumed that a photosensitive member subject to an exposure is a planar member S, and another photosensitive member which is exposed next to the member S is indicated by S'. The sheet-like photosensitive members S, S' move at a given speed and in a direction indicated by an arrow, namely, from right to left.

Assuming that a copying magnification of m is utilized, the optical distance from the surface of the original O to the focusing lens system L, as measured along the optical axis of the lens, is given by (0+f/m where f represents the focal length of the lens L, while the optical distance from the lens L to the surface of the photosensitive member is given by (1+m)f.

The lamp La is illuminated during the exposure of the photosensitive member and moves from its solid line to its broken line position at a uniform rate. In the meantime, the focusing lens system L moves in synchronized relationship with the movement of the lamp La from its solid line to its broken line position. When the lens system L assumes its solid line position, an end A of a scanned region of the original corresponds to point A' on the imaging or focused surface, and when the focusing lens system L assumes its broken line position, an end B of the scanned region corresponds to point B' on the focused surface.

As mentioned previously, the photosensitive member S moves from right to left, and hence, as viewed in FIG. 1, the right-hand side represents an upstream side while the left-hand side represents a downstream side, as viewed in the direction of movement of the photosensitive member.

Point A' is referred to as an exposure initiation location and point B' as an exposure termination location. It is a feature of the invention that the exposure initiation location A' and the exposure termination location B' are separate from each other and the former is located downstream and the latter is located upstream, as viewed in the direction of movement of the photosensitive member.

A slitwise exposure of the photosensitive member S takes place as follows: Specifically, at the instant when the exposure is initiated, the leading end $S_1$ of the photosensitive member S lies at the exposure initiation location A' as shown. If the exposure is now initiated, the lamp La moves to the left from its solid line position at a uniform rate, and the focusing lens system L simultaneously moves to the left from its solid line position at a uniform rate. The photosensitive member S also moves from right to left at a uniform rate.

As the lamp La, the focusing lens system L and the photosensitive member S move, the slitwise exposure of the photosensitive member proceeds, and the exposure location moves from the location A' toward the location B'. When the lamp La and the lens system L reach their broken line positions, the image location reaches the location B' and the leading end of the photosensitive member S lies at a point $S'_1$ while its trailing end $S_2$ lies at the exposure termination location B'.

Subsequently, the lens system L and the lamp La are returned to their start positions shown in solid lines while the photosensitive members S, S' continue to move to the left, as viewed in FIG. 1. Since the speed of movement of the photosensitive member remains invariable, if it is assumed that the lamp La and the lens system L return with the same speed as the speed of movement chosen during the exposure, it will be seen that when the lamp and the lens system return to their start positions, the trailing end $S_2$ of the photosensitive member S or the leading end of the next following photosensitive member S' reaches the exposure initiation location A'. Consequently, an exposure of the next photosensitive member S' can be initiated immediately upon returning of the lamp La and the lens system L to their start positions.

It will be appreciated that there must be a predetermined relationship among the speed of movement of the lamp La or the scanning rate of the original O, the speed of movement of the lens system L and the speed of movement of the photosensitive members S, S' in order for the described exposure to be enabled. Considering such relationship, the distance between the points A, B is represented by 1 and the distance between the points A', B' by l/n. It should be understood that the value of l/n is a matter of design, and can be arbitrarily chosen. In other words, any suitable value of n can be chosen provided that it is positive, except for a value of n which is equal to 1/m and equal to infinity, for reasons to be mentioned later. It is also assumed that the focusing lens system L moves through a distance of $l_L$.

To determine the distance $l_L$ through which the lens system L moves, it will be noted from the geometrical relationship shown that $$m\left(\frac{l}{2} - \frac{l_L}{2}\right) = \frac{l}{2n} + \frac{l_L}{2} \tag{1}$$

Solving the equation (1) for $l_L$, we have $$l_L = \frac{(mn - 1)}{n(m + 1)} l \tag{2}$$

A relationship between the speed of movement v of the lamp La, the speed of movement, $v_L$, of the focusing lens system L, the speed of movement $v_S$, of the photosensitive member S will be determined. It is assumed for convenience that the speed of movement v of the lamp La is predetermined, and it is then desired to express $v_L$ and $v_S$ as functions of v.

Given the speed of lamp movement v, the ratio l/v determines a scan period $T_{sc}$ by the lamp La. It will be seen that the period $T_{sc}$ is equal to the length of time for the lens system L to move through the distance $l_L$. Hence $$T_{sc} = l/v = l_L/v_L \tag{3}$$

or $$v_L = l_L/l \, v \tag{4}$$

By utilizing the right side of the equation (2) for $l_L$, we have $$v_L = \frac{mn - 1}{n(1 + m)} v \tag{5}$$

Considering the function for $v_S$, it will be noted that the exposure location is displaced at uniform rate from the initiation location A' to the termination location B' for a time interval which is equal to the period $T_{sc}$. Thus, the exposure location moves with a speed of $1/nT_{sc}$. On the other hand, the photosensitive member S moves through a distance of $(ml - 1/n)$ during the same period $T_{sc}$, and hence the speed of its movement is given as follows:

$$v_s = \frac{1}{T_{sc}}\left(ml - \frac{l}{n}\right) \quad (6)$$

Rewriting this, we have $$v_s = \frac{l}{T_{sc}}\left(m - \frac{1}{n}\right)$$

Setting $l/T_{sc} = v$, we have $$v_s = \left(m - \frac{1}{n}\right)v \quad (7)$$

Considering the values of m and n for which the invention can be implemented, it will be understood from the foregoing description that the invention is inapplicable unless the following inequality $$ml > l/n \quad (8)$$

is satisfied. Accordingly, to carry out the invention, it is essential that $$mn > 1 \quad (9)$$

As a situation in which the inequality is not satisfied, let us consider a case in which $mn = 1$ or $n = 1/m$. Accordingly, $1/n = ml$. Hence $$v_L = \frac{mn - 1}{n(1 + m)}v = 0, v_s = 0$$

It will be seen that this case corresponds to an exposure utilizing a flashlight when the original, the focusing lens system and the photosensitive member are fixed relative to each other. Unless the flashlight exposure is utilized, it is impossible to cause a consistent movement of the photosensitive member S at a uniform rate, but it must be maintained at rest during the exposure. This requires a complex mechanism for effecting the movement of the photosensitive member, which explains that the value of n must not be equal to $1/m$.

On the other hand, if the value of n is not equal to infinity, it results that $1/n = 0$, $v_s = mv$, $v_L = mv/(1 + m)$. This corresponds to a fixed position imaging process utilizing a movement of the focusing lens system. In this instance, no exposure can be made of a portion of the photosensitive member which moves past the focusing position during the time the movable part of the exposure optics returns to its start position. Accordingly, a waste between an exposed photosensitive member S and a next following, unexposed photosensitive member S' cannot be minimized. This explains why a value of n equal to infinity is excluded. It is also to be noted that as compared with the flash exposure as utilizing a flashlight, it is only necessary in the process of the invention that a region of the photosensitive member which must be maintained planar for purpose of exposure is reduced to $1/n$ times the region required in the prior art, enabling a reduction in the size of the arrangement.

Figure 2:
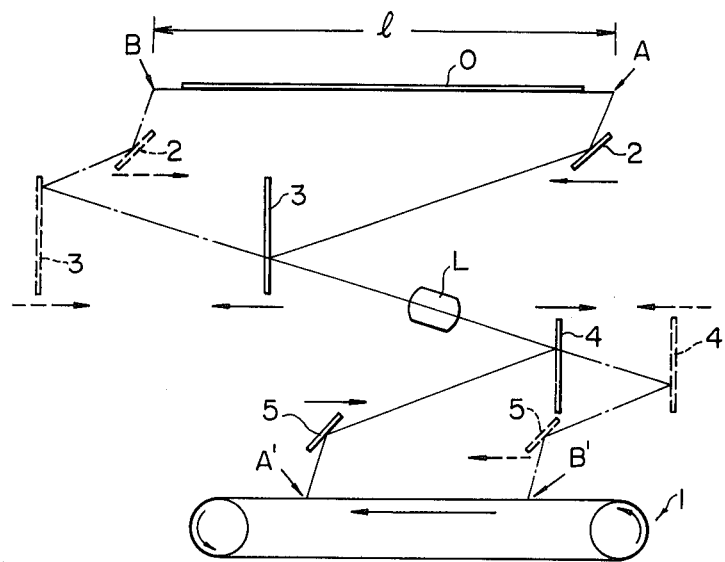
FIG. 2 is a schematic front view of essential parts of another form of exposure apparatus which is used to carry out the invention.

FIG. 2 shows another form of exposure apparatus which may be used to carry out the invention. For brevity, similar characters are used as before unless confusion is likely. In the description to follow, the copying magnification is represented by m.

In FIG. 2, a photosensitive member 1 is in the form of an endless belt, which is rotatable in a direction indicated by an arrow. A plurality of plane mirrors 2, 3, 4 and 5 are provided. In this example, the exposure optics comprises a focusing lens system L and plane mirrors 2 to 5, and the mirrors 2 to 5 represent a movable part of the optics. As before, characters A', B' represent locations corresponding to the initiation and the end of the exposure, with the distance between the points A', B' being represented by $l/n$.

While an endless belt which circulates in one direction does not have an upstream or a downstream side, as viewed in the direction of movement of its surface, it can be stated that as limited between the locations A' and B' between which an exposure takes place actually, the surface of the photosensitive member always moves from the termination location B' toward the initiation location A'. It is to be understood that the expression that "an exposure termination location B' is situated upstream of an exposure initiation location, as viewed in the direction of movement of the surface of a photosensitive member" also includes such disposition. What is meant by a movement of the exposure location from the initiation to the termination location is obviously a movement in a direction opposite from the direction of movement of the surface of the photosensitive member.

In the example shown in FIG. 2, the exposure of the photosensitive member 1 takes place as follows. The peripheral surface of the photosensitive member 1 moves in the direction of the arrow with a speed $v_{S1}$. The plane mirror 2 scans an original O while it moves from its start position shown in solid line to its broken line position with a speed of $v_2$. At this time, the plane mirror 3 moves from its start position shown in solid line to its broken line position with a speed $v_3$ equal to one-half the value of $v_2$, maintaining the optical path length from the original O to the focusing lens system L. The plane mirrors 4 and 5 also move from their start positions shown in solid line to their broken line positions, with speeds of $v_4$ and $v_5$, respectively. Since the optical path length from the focusing lens system L to the exposure location must be maintained constant, it follows that $v_4$ must be equal to one-half the value of $v_5$. After the termination of the exposure, the plane mirrors 2 to 5 return to their start positions shown in solid line.

A relationship between $v_{S1}$, $v_2$, $v_3$, $v_4$ and $v_5$ will now be considered assuming that $v_2$ has a given value. An original scan period is given by $l/v_2$. The plane mirror 5 moves through a distance $l/n$ which is equal to the distance across the locations A', B'. The plane mirror 5 must move through this distance $l/n$ within a time interval of $l/v_2$. Hence, $$v_5 = l/n \times v_2/l = v_2/n \quad (10)$$

This determines the speed of movement of the plane mirror 5.

As mentioned previously, $v_3 = \frac{1}{2}v_2$, and $v_4 = \frac{1}{2}v_5$.

Hence, we have $$v_3 = \frac{1}{2} v_2, \quad v_4 = \frac{v_2}{2n} \quad (11)$$

It will be obvious that the plane mirrors 2, 3, 4 and 5 move through distance which are equal to 1, 1/2, 1/2n and 1/n, respectively.

Considering now $v_{S1}$, it will be noted by a consideration of the example shown in FIG. 1 that the photosensitive member 1 must move through a distance equal to $ml-l/2$ within the scan period of $l/v_2$. Thus, $$v_{S1} = \frac{l}{n}(mn - 1) \times \frac{v_2}{l} = \frac{mn - 1}{n} v_2 \quad (12)$$

Figure 3:
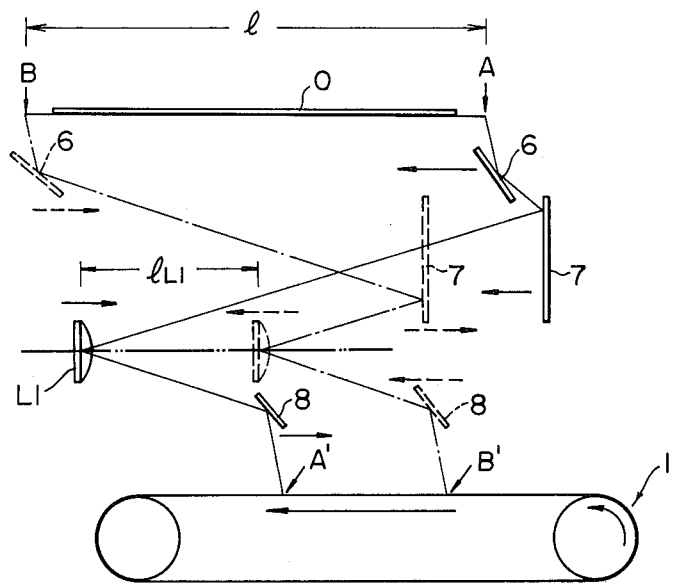
FIG. 3 is a schematic front view of essential parts of a further form of exposure apparatus which is used to carry out the invention.

FIG. 3 shows a further form of exposure apparatus which is used to carry out the present invention. In this instance, the exposure optics comprises a focusing lens system L1, formed by an in-mirror-lens, and plane mirrors 6, 7 and 8. The lens system L1 and the plane mirrors 6, 7 and 8 represent a movable part, which move from their start positions shown in solid line to their broken line positions to perform an exposure of the photosensitive member 1.

Assuming that the plane mirror 6 moves with a speed $v_6$ having a given value, the speed of movements $v_7$ and $v_8$ of the plane mirrors 7, 8, the speed of movement $v_{L1}$ of the lens system L1 and the peripheral speed $v_{S2}$ of the photosensitive member 1 will now be considered.

The distance between points A', B' is given by $l/n$. Hence, the peripheral surface of the photosensitive member moves through a distance equal to $ml-l/n$ within a scan period. Due to the requirement that the optical path length on the image side of the lens system L1 must be maintained constant, it follows that a distance $l_{L1}$ through which the lens system L1 moves is equal to a distance through which the plane mirror 8 moves or $l/n$. Thus, $$l_{L1} = l/n \quad (13)$$

The plane mirror 6 moves through a distance of l, and the distance through which the plane mirror 7 moves can be determined to be $(1-l_{L1})/2$ because the optical path length on the object side of the lens system L1 must be maintained constant. The scan period is given by $l/v_6$, and hence other speeds are given as follows:

$$v_7 = \frac{l - l_{L1}}{2} \times \frac{v_6}{l} = \frac{l - \frac{l}{n}}{2} \cdot \frac{v_6}{l} \quad (14)$$

$$= \frac{l(n-1)}{l 2n} \times v_6 = \frac{n-1}{2n} \times v_6$$

$$v_8 = \frac{l_{L1}}{l} v_6 = \frac{l}{ln} v_6 = \frac{v_6}{n} \quad (15)$$

$$v_{L1} = \frac{v_6}{n} \quad (16)$$

$$v_{S2} = \frac{l(mn - 1)}{n} \cdot \frac{v_6}{l} = \frac{(mn - 1)v_6}{n} \quad (17)$$

Figure 4:
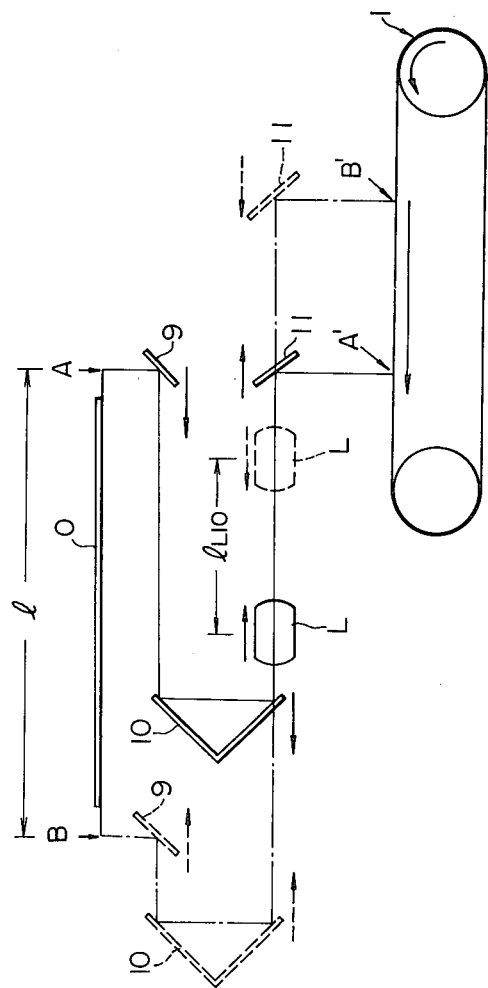
FIG. 4 is a schematic front view of essential parts of still another form of exposure apparatus which is used to carry out the invention.

FIG. 4 shows still another form of exposure apparatus which is used to carry out the invention. In this instance, the exposure optics comprises plane mirrors 9, 11, Dach mirror 10 and a focusing lens system L, all of which represent a movable part.

Representing the distance between points A', B' by $l/n$ as before, it follows from the requirement that the optical path length must be maintained constant that $$l_{L10} = l/n \quad (18)$$

This is equal to the distance through which the plane mirror 11 moves. The distance through which the peripheral surface of the photosensitive member 1 moves within an exposure period is equal to $ml-l/n$. The Dach mirror 10 moves through a distance which is determined to be $1-l_{L10}=1-l/n$ from the requirement for a constant optical path length. The exposure takes place during a movement of the respective movable elements from their start positions shown in solid line to their broken line positions.

Assuming that the plane mirror 9 moves with a speed of $v_9$ of a given value, the speed of movement, $v_{10}$, of the Dach mirror 10, the speed of movement, $v_{L10}$, of the focusing lens system L, the speed of movement, $v_{11}$, of the plane mirror 11, and the peripheral speed $v_{S3}$ of the photosensitive member 1 are given as follows:

$$v_{10} = \frac{l(n-1)}{n} \cdot \frac{v_9}{l} = \frac{(n-1)}{n} v_9 \quad (19)$$

$$v_{11} = \frac{l}{n} \cdot \frac{v_9}{l} = \frac{v_9}{n} \quad (20)$$

$$v_{L10} = v_{11} = \frac{v_9}{n} \quad (21)$$

$$v_{S3} = \frac{l(mn - 1)}{n} \cdot \frac{v_9}{l} = \frac{(mn - 1)}{n} v_9 \quad (22)$$

In a usual design, the speed of movement of the surface of the photosensitive member is determined initially, and the speed of movement of the movable part in the exposure optics is determined on the basis of the speed of movement of the photosensitive member. In this instance, the above equations can be solved to define the various speeds as a function of the speed of movement of the photosensitive member.

When it is attempted to speed up the slitwise exposure, a control over the acceleration and the deceleration of the movable part of the exposure optics toward the opposite ends of its reciprocating movement may be rendered difficult. However, with the process of the invention, in particular, in the example shown in FIG. 1 in which m=1 and n=2, the stroke through which the lens moves is as short as one-fourth the length of the original being scanned, thus permitting the speed of movement of the lens system to be reduced. Consequently, the problem of acceleration and deceleration mentioned above can be easily accommodated for, allowing a high speed operation. Where n=2 and m=1 are employed, the surface of the photosensitive member may move with a speed which is as low as one-half the scanning speed of the original. Consequently, a series of operations which are necessary to effect the conversion of operations which are necessary to effect the conversion into visual image, including a developing step, can be performed at a low rate which corresponds to the speed of movement of the surface of the photosensitive member. Thus, the use of the invention enables an improvement in the speed of copying operations.

The invention is also applicable to a drum-shaped photosensitive member having a reduced curvature and a reduced spacing between the exposure initiation and the exposure termination location. The invention is also applicable to a photosensitive member having a peripheral surface which is concave in one dimension, if a rotating mirror is used. Also, it is not essential that the original be placed in planar form. It should also be noted that the time required for the movable part of the exposure optics to return to its start position can be suitably chosen depending on actual designs.

What is claimed is:

1. A process of effecting slitwise exposure of a flat photosensitive member by projecting an optical image of a stationary original onto the surface of the flat photosensitive member which moves in parallel with exposure optics including a parallel moving part; characterized in that an exposure initiation location on the photosensitive member is situated downstream as viewed in the direction of movement of the surface of the photosensitive member and an exposure termination location on the photosensitive member is situated upstream as viewed in the direction of movement of the surface of the photosensitive member, an image location moving from the exposure initiation to the exposure termination location within the space of a copying arrangement, wherein a copying magnification can be selected by the speed ratio between the photosensitive member and the movable part.

2. A process according to claim 1 in which the original is placed in planar form and the surface of the photosensitive member runs in parallel relationship with the surface of the original during the exposure.

3. A process according to claim 2 in which the exposure optics comprises a focusing lens system alone, the focusing lens system being a through-lens having its optical axis disposed in a direction perpendicular to the surface of the original, the lens being driven for reciprocating movement in a direction perpendicular to the optical axis, an exposure taking place during a forward stroke of the reciprocating movement, the speed of movement $v_L$ of the focusing lens system and the speed of movement $v_S$ of the surface of the photosensitive member during the exposure being given by $$v_L = \frac{mn-1}{n(1+m)} v, \text{ and } v_S = \left(m - \frac{1}{n}\right) v$$

where $v$ represents an original scanning speed, $m$ a magnification and $n$ a positive number not equal to $1/m$ and infinity.

4. A process according to claim 3 in which the photosensitive member is in the form of a sheet.

5. A process according to claim 3 in which the photosensitive member is in the form of an endless belt.

6. A process according to claim 2 in which the exposure optics comprises a first and a second plane mirror, a focusing lens system formed by a through-lens, and a third mirror and a fourth plane mirror disposed in the sequence named to define an optical path, the first, the second, the third and the fourth plane mirror representing the movable part of the exposure optics, the speeds of movement $v_3$, $v_4$ and $v_5$ of the second, the third and the fourth plane mirror as well as the speed of movement $v_{S1}$ of the surface of the photosensitive member being given by $$v_3 = \frac{1}{2} v_2, \ v_4 = \frac{v_2}{2n}, \ v_5 = \frac{v_2}{n}, \ v_{S1} = \frac{(mn-1)}{n} v_2$$

where $v_2$ represents the speed of movement of the first plane mirror.

7. A process according to claim 6 in which the photosensitive member is in a form of an endless belt.

8. A process according to claim 6 in which the photosensitive member is in the form of a sheet.

9. A process according to claim 2 in which the exposure optics comprises a first and a second plane mirror, a focusing lens system formed by an in-mirror-lens, and a third plane mirror disposed in the sequence named to define an optical path, the first, the second and the third plane mirror and the focusing lens system representing the movable part of the exposure optics, the speed of movement $v_7$, $v_8$ of the second and the third plane mirror, the speed of movement $v_{L1}$ of the focusing lens system and the speed of movement $v_{S2}$ of the surface of the photosensitive member during the exposure being given as follows:

$$v_7 = \frac{n-1}{2n} v_6, \ v_8 = \frac{v_6}{n}, \ v_{L1} = \frac{v_6}{n}$$

and $$v_{S2} = \frac{(mn-1)}{n} v_6$$

where $v_6$ represents the speed of movement of the first plane mirror.

10. A process according to claim 9 in which the photosensitive member is in the form of an endless belt.

11. A process according to claim 9 in which the photosensitive member is in the form of a sheet.

12. A process according to claim 2 in which the exposure optics comprises a first plane mirror, a Dach mirror, a focusing lens system formed by a through-lens, and a second plane mirror disposed in the sequence named to define an optical path, the first and the second plane mirror, the Dach mirror and the focusing lens system representing the movable part of the exposure optics, the speed of movement $v_{10}$ of the Dach mirror, the speed of movement $v_{L10}$ of the focusing lens system, the speed of movement $v_{11}$ of the second plane mirror and the speed of movement $v_{S3}$ of the surface of the photosensitive member during the exposure being given as follows:

$$v_{10} = \frac{(n-1)}{n} v_9, \ v_{11} = \frac{v_9}{n}, \ v_{L10} = \frac{v_9}{n}$$

and $$v_{S3} = \frac{(mn-1)}{n} v_9$$

where $v_9$ represents the speed of movement of the first plane mirror.

13. A process according to claim 12 in which the photosensitive member is in the form of an endless belt.

14. A process according to claim 12 in which the photosensitive member is in the form of a sheet.

* * * * *